United States Patent
Hazama

Patent Number: 6,128,371
Date of Patent: Oct. 3, 2000

[54] MULTIPLE-SERVICE OFFERING COMMUNICATION TERMINAL AND MULTIPLE-SERVICE OFFERING APPARATUS

[75] Inventor: Kaori Hazama, Tokyo, Japan

[73] Assignee: Mitsubishi Denki Kabushiki Kaisha, Tokyo, Japan

[21] Appl. No.: 09/151,108

[22] Filed: Sep. 10, 1998

[30] Foreign Application Priority Data

Mar. 20, 1998 [JP] Japan .................................. 10-072657

[51] Int. Cl.[7] ...................................................... H04M 1/24
[52] U.S. Cl. .............................. 379/32; 379/157; 379/165
[58] Field of Search ..................................... 379/156, 157, 379/164, 165, 158, 159, 160, 162, 163, 265, 266, 309, 1, 9, 10, 26, 27, 28, 39, 32

[56] References Cited

U.S. PATENT DOCUMENTS 5,712,909 1/1998 Hara ........................................ 379/165

FOREIGN PATENT DOCUMENTS

| 58-138155 | 8/1983 | Japan . |
| 398366 | 4/1991 | Japan . |
| 5167718 | 7/1993 | Japan . |
| 715538 | 1/1995 | Japan . |
| 974448 | 3/1997 | Japan . |

Primary Examiner—Curtis A. Kuntz
Assistant Examiner—Rexford Barnie
Attorney, Agent, or Firm—Rothwell, Figg, Ernst & Manbeck

[57] ABSTRACT

A multiple-service offering communication terminal and a multiple-service offering apparatus comprise a multiple-service common judgment control unit for judging information on a communication failure or the occurrence of a failure which is provided with a multiple-device informing function to inform a user by controlling accessory terminals according to information to improve the efficiency of the way of informing a plurality of devices of a failure or the like and the operation efficiency of the user.

6 Claims, 6 Drawing Sheets

| COMMUNICATION SERVICE CONDITIONS | TYPE OF RECEIVING TERMINAL | SAME AS EFFECTIVE TERMINAL | | | | SAME AS INEFFECTIVE TERMINAL | | | |
|---|---|---|---|---|---|---|---|---|---|
| | TYPE OF RECEPTION SERVICE | RECEIVER-SPECIFIED SERVICE | | BROADCAST SERVICE | | RECEIVER-SPECIFIED SERVICE | | BROADCAST SERVICE | |
| | PRIORITY OF RECEPTION SERVICE | HIGH | LOW | HIGH | LOW | HIGH | LOW | HIGH | LOW |
| USER TERMINAL OPERATION STATE | ABSENCE OF EFFECTIVE TERMINAL OPERATION | ○ | ○ | ○ | ○ | ○ | ○ | ○ | ○ |
| | PRESENCE OF EFFECTIVE TERMINAL OPERATION | ○ | ○ | ○ | ✕ | ○ | ✕ | ○ | ✕ |

○ = ACCEPT IMMEDIATELY   ✕ = DOES NOT ACCEPT

| COMMUNICATION SERVICE CONDITIONS | TYPE OF RECEIVING TERMINAL | SAME AS EFFECTIVE TERMINAL | | | | SAME AS INEFFECTIVE TERMINAL | | | |
|---|---|---|---|---|---|---|---|---|---|
| | TYPE OF RECEPTION SERVICE | RECEIVER-SPECIFIED SERVICE | | BROADCAST SERVICE | | RECEIVER-SPECIFIED SERVICE | | BROADCAST SERVICE | |
| | PRIORITY OF RECEPTION SERVICE | HIGH | LOW | HIGH | LOW | HIGH | LOW | HIGH | LOW |
| USER TERMINAL OPERATION STATE | ABSENCE OF EFFECTIVE TERMINAL OPERATION | O | O | O | O | O | O | O | O |
| | PRESENCE OF EFFECTIVE TERMINAL OPERATION | O | O | O | O | O | O | O | O |

O = ACCEPT IMMEDIATELY    X = DOES NOT ACCEPT

MULTIPLE-SERVICE OFFERING COMMUNICATION TERMINAL AND MULTIPLE-SERVICE OFFERING APPARATUS

BACKGROUND OF THE INVENTION

1. Field of the Invention

The present invention relates to a multiple-service offering apparatus such as a multiple-service offering communication terminal which has a plurality of devices having a function to inform a user and offers a plurality of services with a single apparatus.

2. Description of the Prior Art

Services which enable information to be accessed by various means such as voice, data and facsimile are offered by wireless communication. Further, these services include a service which enables a user to specify a receiver to be communicated with and a broadcast service which enables a user belonging to a specific group to receive information. In recent years, a multiple-service offering communication terminal which can offer these services with a single communication terminal has been used. This is intended to expand the function of a communication terminal by connecting the communication terminal to a handset for voice communication, data terminal such as a personal computer for data communication, facsimile for facsimile communication, a push-to-talk microphone for push-to-talk communication and the like. This communication terminal is effective as a portable communication terminal when a plurality of communication lines cannot be laid. The above multiple-service offering communication terminal comprises a communication terminal body and various accessory terminals connected to the communication terminal body subordinately. Since a device as means of informing a user is provided for the communication terminal body and each of the accessory terminals, a user is in such an environment that a plurality of devices to check information with are provided.

Figure 5:
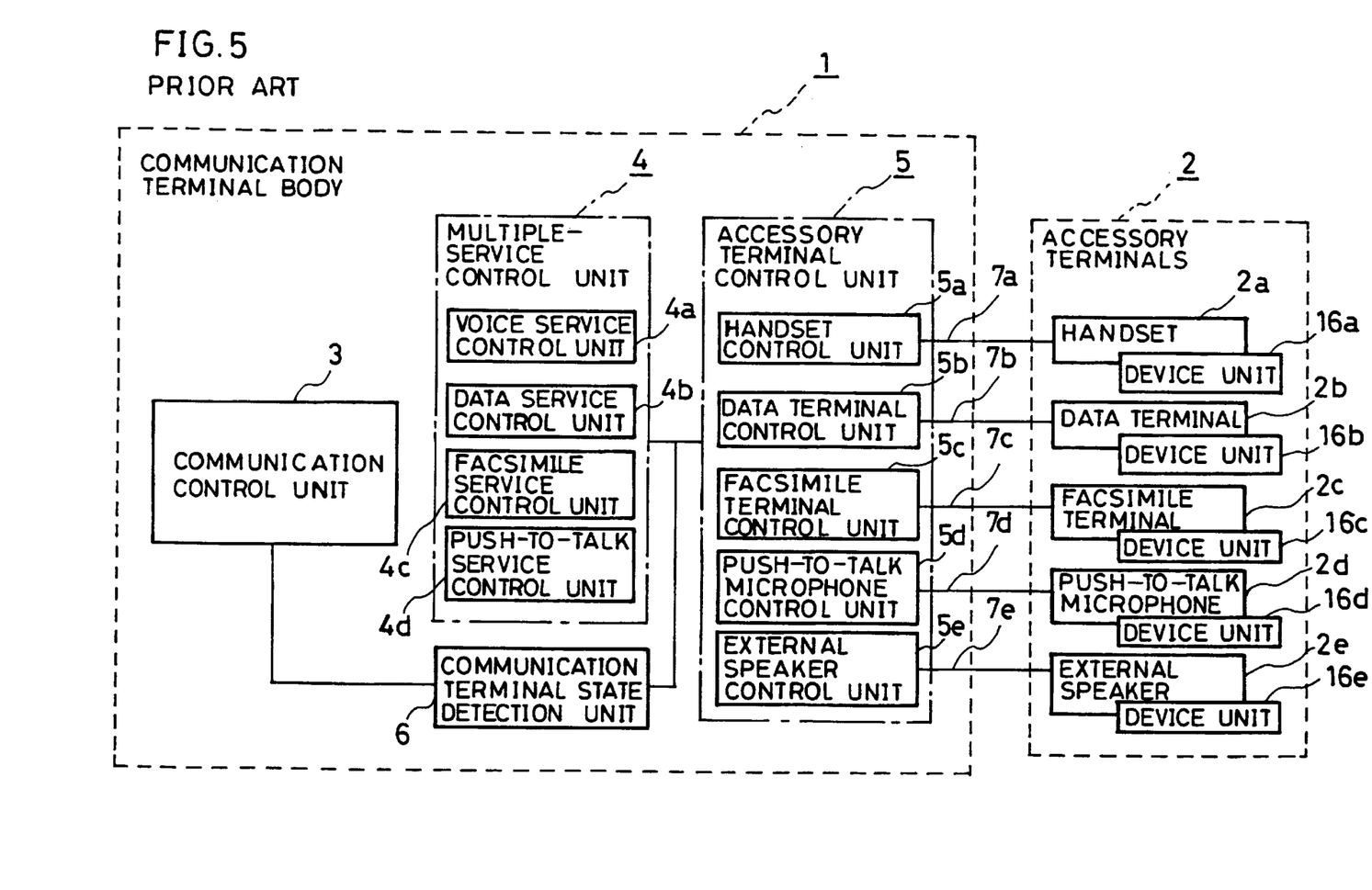
FIG. 5 is a diagram showing he constitution of a multiple-service offering communication terminal of the prior art.

FIG. 5 is a block diagram showing the constitution of a multiple-service offering communication terminal of the prior art. Reference numeral 1 denotes a communication terminal body for transmitting and receiving information with an unshown base station, and 2 an accessory terminal unit comprising a plurality of accessory terminals to be operated by a user for communication. The accessory terminal unit 2 comprises accessory terminals—a handset 2a, data terminal 2b, facsimile terminal 2c, push-to-talk microphone 2d and external speaker 2e—and device units 16a to 16e having a function to inform a user, such as a speaker and LED, provided for the respective accessory terminals 2a to 2e. The communication terminal body 1 comprises a communication control unit 3 for processing wire or wireless communication with the base station, a multiple-service control unit 4, consisting of a voice service control unit 4a, data service control unit 4b, facsimile service control unit 4c, and push-to-talk service control unit 4d, for controlling a plurality of communication services, an accessory terminal control unit 5, consisting of a handset control unit 5a, data terminal control unit 5b, facsimile terminal control unit 5c, push-to-talk microphone control unit 5d and external speaker control unit 5e corresponding to the above accessory terminals 2a to 2e of the accessory terminal unit 2, for controlling the accessory terminals 2a to 2e, and a communication terminal state detection unit 6 for monitoring communication terminal states such as the states of the above accessory terminals 2a to 2e and the state of a circuit and for detecting a failure or the like. In FIG. 5, reference symbols 7a to 7e are wire or wireless transmission lines connecting the communication terminal body 1 to the accessory terminals 2a to 2e.

A description is subsequently given of the operation of the above-structured multiple-service offering communication terminal. To offer a service such a voice service or data service to a user, the communication control unit 3 processes the transmission and reception of signals for the service with the base station and activates the corresponding service control unit out of the service control units 4a to 4d of the multiple-service control unit 4. The activated service control unit activates one or more control units to be used by a user for the service out of the control units 5a to 5e for controlling the accessory terminals 2a to 2e. The control units 5a to 5e control devices 16a to 16e such as a display, speaker and microphone provided for the respective accessory terminals 2a to 2e to offer the service to the user.

Thus, the multiple-service offering communication terminal offers services such as a voice service and a data service through the accessory terminals corresponding to the respective services and the devices provided for the above respective accessory terminals. The user uses an accessory terminal for each service. Combinations of accessory terminals and devices other than the above combinations of the accessory terminals and the devices provided for the respective accessory terminals are possible.

When the communication terminal state detection unit 6 detects a failure or abnormality in the apparatus or abnormality in a communication circuit while the multiple-service offering communication terminal is in operation, a signal indicative of the detection of abnormality is transmitted to the accessory terminal control unit 5. The accessory terminal control unit 5 informs an accessory terminal used by the user of the accessory terminal unit 2 or a default accessory terminal. This default accessory terminal is an accessory terminal which becomes effective when the user does not use a specific accessory terminal and is automatically displayed on a display device when the apparatus is turned on. This accessory terminal can be specified by the user in advance. The user accesses information transmitted to the device (such as a display) of his/her accessory terminal or default accessory terminal to know a failure, abnormality or the like.

However, since the above information is transmitted only to the effective accessory terminal, unless the user selects the effective accessory terminal out of a plurality of accessory terminals connected to access the information, he/she cannot access the common information on a failure, abnormality or the like. When information on a detected failure or the like which requires an urgent countermeasure is to be accessed, the user must select the effective accessory terminal and access the information. Further, when the display of the effective accessory terminal is located away from the place where the user uses the accessory terminal, the user must go to the display and access the information.

The above multiple-service offering communication terminal of the prior art has a function to connect or disconnect an accessory terminal to or from the communication terminal body 1 when necessary. When the user disconnects an accessory terminal other than his/her using accessory terminal intentionally or accidentally while he/she uses an accessory terminal for offering a service, he/she can continue the above service without influencing his/her using accessory terminal. However, when the user disconnects his/her using accessory terminal intentionally or accidentally, the multiple-service offering communication terminal cannot continue the above service. To resume the service, the multiple-service offering communication terminal must be reset or powered on again to turn it on again. However, since an accessory terminal which can offer another service is connected to the multiple-service offering communication terminal even when the user's using accessory terminal is disconnected, communication with the other party can be continued using the accessory terminal. However, as the multiple-service offering communication terminal of the prior art does not have this function, a service cannot be continued to be offered.

Figure 6:
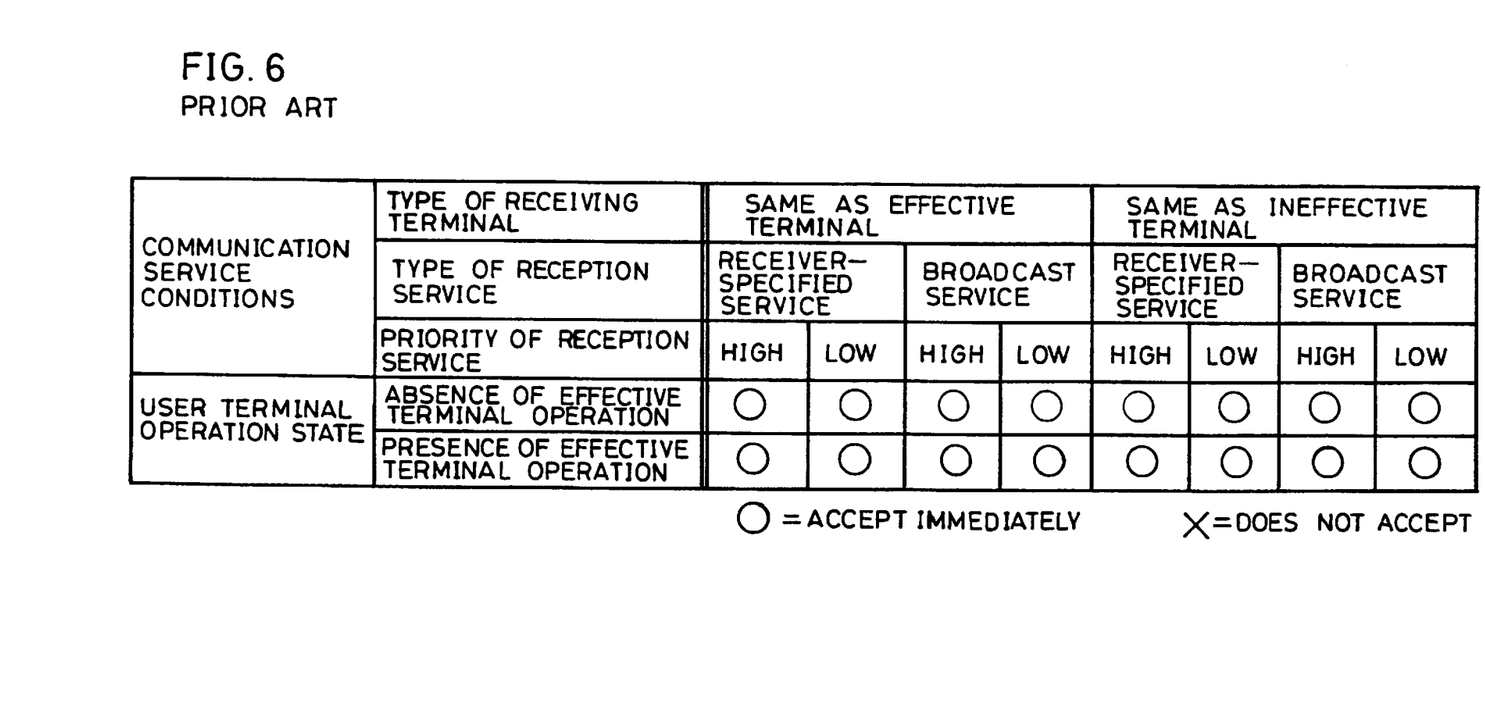
FIG. 6 is a table for explaining the processing of reception by the multiple-service offering communication terminal of the prior art.

Further, since the multiple-service offering communication terminal of the prior art provides all received information for the user to the user, when the user operates a service, the user's operation is interrupted or canceled by the reception of the information. That is, when the user is operating one of the accessory terminals connected to the multiple-service offering communication terminal to use a communication service and a communication service other than the service is received from the base station, the communication control unit 3 processes the reception of incoming signals regardless of the type of the received communication service or whether he/she is operating the accessory terminal or not and informs him/her of the reception of the signals even though he/she is operating the accessory terminal. Therefore, the user has to interrupt his/her operation. FIG. 6 is a table showing judgment on the processing of reception by the multiple-service offering communication terminal of the prior art. Even when the user is using an accessory terminal for the received communication service or an accessory terminal not for the received service, he/she is informed of the reception of the service and requested to instruct the changing of an effective terminal.

Since the multiple-service offering communication terminal of the prior art comprises a plurality of accessory terminals, its function to inform the user of a failure or the reception of a signal is complicated and its operation efficiency is low. The multiple-service offering apparatus which offers various services and comprises a plurality of devices has a problem with the operation efficiency of its user informing function.

SUMMARY OF THE INVENTION

It is an object of the present invention which has been made to solve the above problems to provide a multiple-service offering communication terminal and a multiple-service offering apparatus which improve the way of informing a plurality of devices of a failure or the like and the operation efficiency of a user.

According to a first aspect of the present invention, there is provided a multiple-service offering communication terminal which comprises informing means having a function to inform a user of a failure or the like using two or more devices or all the devices connected to the terminal.

According to a second aspect of the present invention, there is provided a multiple-service offering communication terminal, wherein accessory terminals can be disconnected from a communication terminal body and a user informing function is continued even when an accessory terminal is disconnected.

According to a third aspect of the present invention, there is provided a multiple-service offering communication terminal, wherein when an accessory terminal to be disconnected carries out communication, the communication is continued by handing it over to another accessory terminal.

According to a fourth aspect of the present invention, there is provided a multiple-service offering communication terminal, wherein when information on recovery from a failure or the like is to be updated, the multiple-device informing function is canceled and information to be provided to the plurality of devices is updated.

According to a fifth aspect of the present invention, there is provided a multiple-service offering communication terminal which comprises means for judging whether received information should be provided to a user based on the operation state of an accessory terminal when voice, data or other information is received.

According to a sixth aspect of the present invention, there is provided a multiple-service offering apparatus which comprises common control means having a function to inform a user of a failure or the like using two or more devices or all of a plurality of devices provided for electric devices connected to the apparatus, an information cancellation function to update information to be provided to the plurality of devices and an operation continuation function to hand over the operation of an electric device in operation to another electric device.

The above and other objectives, features and advantages of the invention will become more apparent from the following description when taken in conjunction with the accompanying drawings.

DETAILED DESCRIPTION OF THE PREFERRED EMBODIMENTS

Preferred Embodiments of the present invention will be described hereinunder with reference to the accompanying drawings.

In the following description, the same or corresponding elements as those of the prior art are given the same reference symbols.

Embodiment 1

Figure 1:
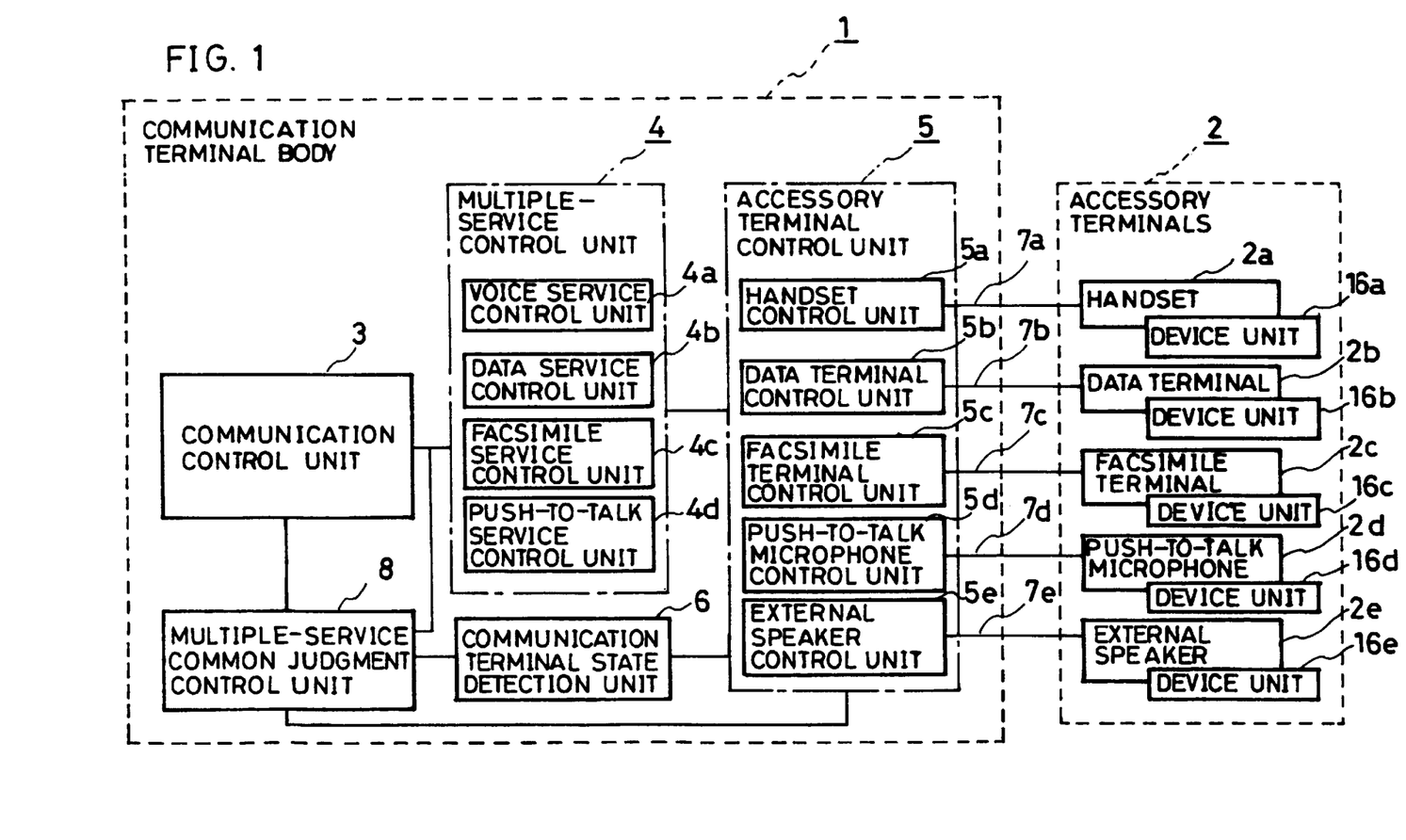
FIG. 1 is a diagram showing the constitution of a multiple-service offering communication terminal according to Embodiments 1, 2, 3 and 4 of the present invention.

FIG. 1 is a block diagram of a multiple-service offering communication terminal according to Embodiment 1 of the present invention. Reference numeral 1 denotes a communication terminal body for transmitting and receiving a signal with an unshown base station, and 2 an accessory terminal unit comprising accessory terminals to be operated by a user for communication. The accessory terminal unit 2 comprises accessory terminals—a handset 2a, data terminal 2b, facsimile terminal 2c, push-to-talk microphone 2d and external speaker 2e—and device units 16a to 16e having a user informing function such as a speaker and LED provided for the respective accessory terminals 2a to 2e. The communication terminal body 1 comprises a communication control unit 3 for processing wire or wireless communication with the base station, a multiple-service control unit 4, consisting of a voice service control unit 4a, data service control unit 4b, facsimile service control unit 4c and push-to-talk service control unit 4d, for controlling a plurality of communication services, an accessory terminal control unit 5, consisting of a handset control unit 5a, data terminal control unit 5b, facsimile terminal control unit 5c, push-to-talk microphone control unit 5d and external speaker control unit 5e, for controlling the accessory terminals 2a to 2e, a communication terminal state detection unit 6 for monitoring communication terminal states such as the states of the above accessory terminals 2a to 2e and the state of a circuit and for detecting a failure or the like, and a multiple-service common judgment control unit 8 which is informing means for judging the way of informing the plurality of accessory terminals, having a function (multiple-device informing function) to inform a user of a failure or the like using two or more devices or all the devices connected. In FIG. 1, reference symbols 7a to 7e are wire or wireless transmission lines connecting the communication terminal body 1 to the accessory terminals 2a to 2e.

A description is subsequently given of the operation of the above-structured multiple-service offering communication terminal. When various services are offered to a user, the communication control unit 3 processes the communication of a signal for a service to be offered with the base station, and the multiple-service common judgment control unit 8 judges which service the signal is for and activates the corresponding control unit of the multiple-service control unit 4. When the above signal is for a voice service, the multiple-service common judgment control unit 8 activates the voice service control unit 4a. The voice service control unit 4a activates the handset control unit 5a and the external speaker control unit 5e for controlling the handset 2a and the external speaker 2e which are accessory terminals to be used by the user for the voice service, respectively. The handset control unit 5a and the external speaker control unit 5e control devices 16a such as a display, speaker and microphone provided for the handset 2a and the devices 16e such as a speaker for the external speaker 2e, respectively, to offer the voice service to the user.

When the above signal is for a data service, the multiple-service common judgment control unit 8 activates the data service control unit 4b of the multiple-service control unit 4. The data service control unit 4b activates the data terminal control unit 5b and the external speaker control unit 5e for controlling the data terminal 2b and the external speaker 2e which are accessory terminals to be used by the user for the data service to control the devices 16b such as a display provided for the data terminal 2b and the devices 16e such as a speaker for the external speaker 2e, respectively, so as to offer the data service to the user.

When the above signal is for a facsimile service, the multiple-service common judgment control unit 8 activates the facsimile service control unit 4c. The facsimile service control unit 4c activates the facsimile terminal control unit 5c for controlling the facsimile terminal 2c which is an accessory terminal to be used by the user for facsimile communication to control the devices 16c such as a display and speaker provided for the facsimile terminal 2c so as to offer the facsimile service to the user.

When the signal is for a push-to-talk service, the multiple-service common judgment control unit 8 activates the push-to-talk service control unit 4d. The push-to-talk service control unit 4d activates the push-to-talk microphone control unit 5d and the external speaker control unit 5e for controlling the push-to-talk microphone 2d and the external speaker 2e which are accessory terminals to be used by the user for push-to-talk communication to control the devices 16e such as a display and microphone provided for the push-to-talk microphone 2d and the devices 16e such as a speaker provided for the external speaker 2e, respectively, so as to offer the push-to-talk service to the user.

A description is subsequently given of how to inform a user of a failure or abnormality and the user's operation of handling it when the failure or abnormality independent of service conditions is detected by the above multiple-service offering communication terminal. When a mechanical failure or abnormality in the communication terminal or a failure in the communication of a communication circuit occurs during the operation of the multiple-service offering communication terminal, the communication terminal state detection unit 6 detects the failure and informs the accessory terminal control unit 5 of the detection of the failure through the multiple-service common judgment control unit 8. When the multiple-service common judgment control unit 8 judges that the information is urgent and must be provided to all the accessory terminals including a service accessory terminal used by the user, it controls the accessory terminal unit 5 which then activate all the control units to inform all the accessory terminals of the accessory terminal unit 2. The informed accessory terminals inform the user of the failure using the devices 16a to 16e such as a device display and speaker provided for the accessory terminals.

In this Embodiment 1 of the present invention, the multiple-service common judgment control unit 8 for judging the contents of information on a failure in communication or the occurrence of a failure is provided and the communication terminal body 1 has a multiple-device informing function to inform the user by controlling the accessory terminals according to the contents of the information so that the information on the occurrence of a failure is provided to all the accessory terminals. Therefore, the user does not have to select an effective accessory terminal out of the connected accessory terminals and information on a failure or the like can be provided to the user quickly.

In the above embodiment, all the accessory terminals including a service accessory terminal used by the user are informed. Only the devices of the accessory terminal used by the user or the devices of one or more accessory terminals specified by the user may be informed.

Embodiment 2

In the above Embodiment 1, the communication terminal state detection unit 6 for monitoring communication terminal states such as the states of the accessory terminals 2a to 2e and the state of a circuit and for detecting a failure or the like is provided to detect a failure or abnormality in the communication terminal. In Embodiment 2 of the present invention, the communication terminal state detection unit 6 is further provided with a function to monitor the connection states of the accessory terminals 2a to 2e and inform the multiple-service common judgment control unit 8 of the connection states of the accessory terminals 2a to 2e, and the multiple-service common judgment control unit 8 is also further provided with a function to continue the above informing function according to the connection states of the accessory terminals 2a to 2e so that information on a communication failure or the occurrence of a failure is provided to the accessory terminals 2a to 2e according to the connection states of the accessory terminals 2a to 2e.

For instance, in FIG. 1, when the data terminal 2b is disconnected from the communication terminal body 1, the communication terminal state detection unit 6 detects the disconnection of the data terminal 2b and informs the multiple-service common judgment control unit 8 of it. The multiple-service common judgment control unit 8 does not suspend informing and continues informing the accessory terminals excluding the data terminal 2b without changing the contents of information even when it carries out its multiple-device informing function.

When a disconnected accessory terminal, for example, the facsimile terminal 2c, is newly connected while the multiple-device informing function is carried out, the communication terminal state detection unit 6 detects the connection of the facsimile terminal 2c and informs the multiple-service common judgment control unit 8 of it. The multiple-service common judgment control unit 8 does not suspend informing and continues informing not only the connected accessory terminals but also the newly connected facsimile terminal 2c without changing the contents of information.

Embodiment 3

In the above Embodiment 2, the communication terminal state detection unit 6 is provided with a function to detect the connection states of the accessory terminals. In Embodiment 3 of the present invention, the communication terminal state detection unit 6 is further provided with a function to monitor the recovery from a failure or abnormality of the communication terminal and inform the multiple-service common judgment control unit 8 of the detection of the recovery, and the multiple-service common judgment control unit 8 is also further provided with a function to cancel an informing function. Thereby, information provided to the accessory terminals is cleared and the accessory terminals are returned to the regular states.

That is, when the communication terminal is recovered from a failure or abnormality, the contents of information which may be provided to the accessory terminals at the time of a failure or abnormality in the communication terminal are cleared, information to the user is canceled, and the accessory terminals can be returned to the regular states before the occurrence of the failure or abnormality by the multiple-service common judgment control unit 8.

Embodiment 4

In the above Embodiment 2, the communication terminal state detection unit 6 monitors the connection state of each of the accessory terminals, and the multiple-service common judgment control unit 8 provides information on communication or the occurrence of a failure to the accessory terminals according to the connection state of each of the accessory terminals. In Embodiment 4 of the present invention, the communication terminal state detection unit 6 monitors the connection state of each of the accessory terminals, and the multiple-service common judgment control unit 8 controls such that when an accessory terminal used by the user is disconnected by the user, another accessory terminal is used to continue communication.

A single accessory terminal used by the user while the multiple-device informing function is not carried out is called "effective terminal". Accessory terminals other than this effective terminal are called "ineffective terminal" and indicated as ineffective terminals to the user on the displays of the ineffective terminals. The ineffective terminals are in a standby state that a service can be used at a request of the user or the like. When the user disconnects the effective terminal from the communication terminal body 1 intentionally or accidentally in this state, the communication terminal state detection unit 6 detects the disconnection of the accessory terminal and instructs the communication control unit 3 to process the disconnection of the current service. The communication control unit 3 carries out the processing of communication for the disconnection of the service with the base station and the processing of disconnecting a call according to the above instruction.

The communication terminal state detection unit 6 informs the multiple-service common judgment control unit 8 of the disconnection of the effective terminal at the same time. The multiple-service common judgment control unit 8 carries out the processing of changing the effective terminal to any one of other accessory terminals connected to the communication terminal body 1 according to the above instruction. For instance, when the user disconnects the data terminal 2b which is an effective terminal accidentally, the multiple-service common judgment control unit 8 changes the effective terminal to the facsimile terminal 2c so that data used by the user can be transmitted by a facsimile. Therefore, even when a service is made ineffective by disconnecting the effective terminal offering the service from the communication terminal body 1, not only a circuit loss can be reduced by carrying out the processing of disconnecting a call to the base station immediately but also communication can be continued by making another accessory terminal an effective terminal. Therefore, the availability of the multiple-service offering communication terminal can be maintained.

Embodiment 5

Figure 2:
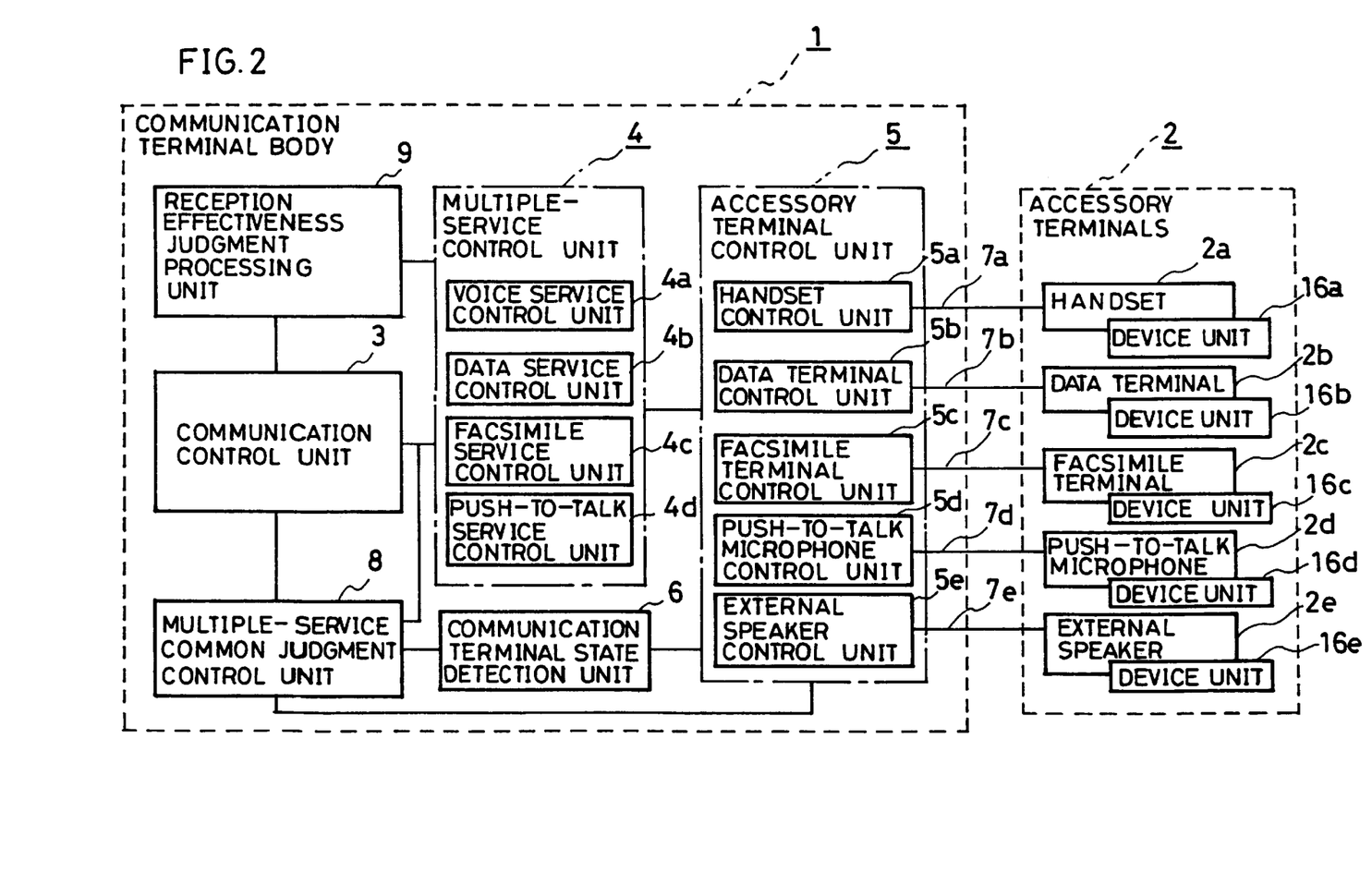
FIG. 2 is a diagram showing the constitution of a multiple-service offering communication terminal according to Embodiment 5 of the present invention.

FIG. 2 is a block diagram of a multiple-service offering communication terminal according to Embodiment 5 of the present invention. In the communication terminal body 1 of FIG. 1, a reception effectiveness judgment processing unit 9 which is means for judging whether reception is effective or not based on reception service conditions received by the communication control unit 3 and user terminal operation information from the multiple-service control unit 4 is provided between the communication control unit 3 and the multiple-service control unit 4.

Figure 3:
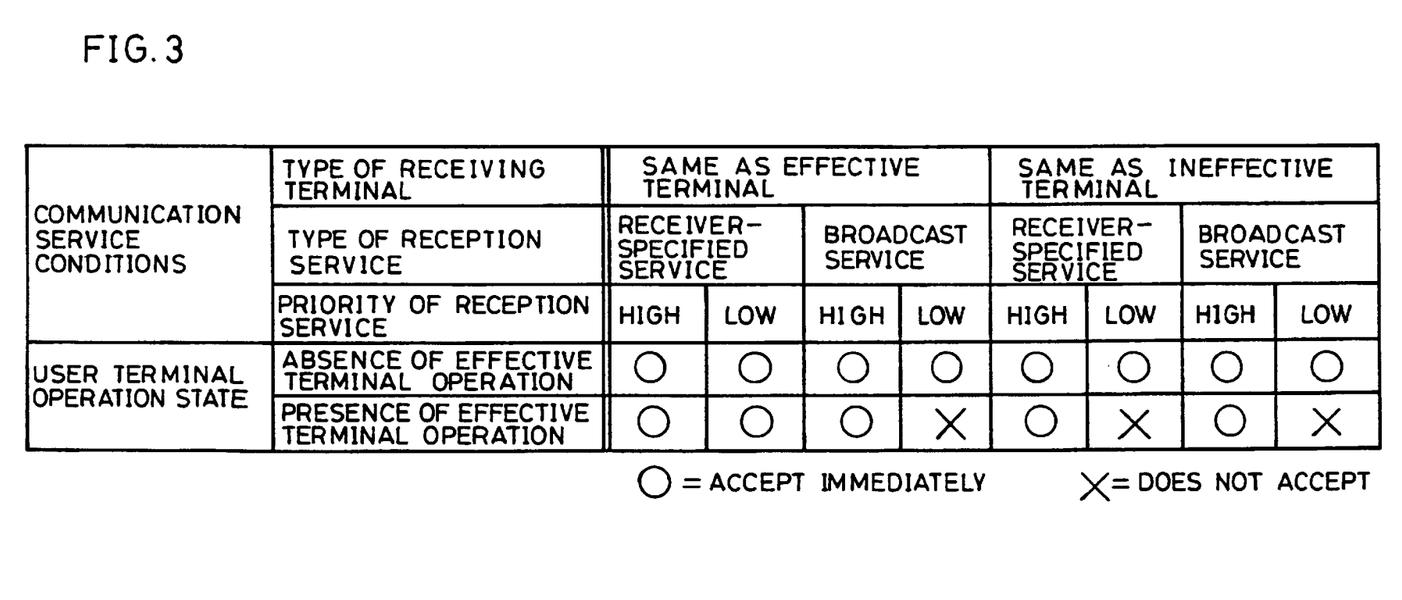
FIG. 3 is a table for explaining the processing of reception according to Embodiment 5 of the present invention.

FIG. 3 is a table showing the operation state of a user terminal and communication service conditions to be judged by the reception effectiveness judgment processing unit 9 and the judgments on the above state and conditions of the reception effectiveness judgment processing unit 9. "Communication service conditions" consist of "type of a receiving terminal" indicating whether the receiving terminal is an effective terminal or a ineffective terminal, "type of a reception service" indicating whether the reception service is a receiver-specified service or a broadcast service without specifying a receiver and "priority of a reception service" indicating the urgency of received information. The "user terminal operation state" indicates whether the user is using an accessory terminal, that is, the existence of an effective terminal. The mark O in FIG. 3 indicates the case where the user is informed of reception and X indicates the case where a received signal is abandoned and the user is not informed of reception. That is, when there is no effective terminal, the reception effectiveness judgment processing unit 9 informs the user of all the received information regardless of communication service conditions. When there is an effective terminal and the type of a receiving terminal is the same as that of the effective terminal, all the received information is provided to the user in the case of a receiver-specified service and only received information having a high degree of urgency is provided to the user in the case of a broadcast service. When there is an effective terminal and the type of a receiving terminal is the same as that of the effective terminal, only information having a high degree of urgency is provided to the user regardless of the type of a reception service.

The case where received information is provided to the user in Embodiment 5 (FIG. 3) is compared with the case where all the received information is provided to the user in the prior art (FIG. 6). For instance, a broadcast service is offered from the base station to the communication terminal regularly. When the user operates any one of the accessory terminals and broadcast service information having a low degree of urgency is received, the user likes to keep on the current operation rather than to get the information having a low degree of urgency. Conventionally, the user has been informed of reception and hence, had to suspend his/her operation. In this Embodiment 5, as the user is not informed of the reception of the above information, he/she can continue his/her current operation. When the user finishes the operation and there is no effective terminal, he/she is informed of the reception of the broadcast service information having a low degree of urgency.

In this Embodiment 5, the reception effectiveness judgment processing unit 9 is provided to judge whether the user should be informed of reception or not according to the operation state of the user's terminal and communication service conditions. Therefore, information that is judged as not required by the user is not provided to the user. Therefore, the suspension of the user's operation by informing of reception can be suppressed.

In the above Embodiment 5, judgment on whether the user should be informed of reception is not limited to the table shown in FIG. 3. The priority of a receiver-specified reception service may be divided into three levels, or the time for judging whether the user is carrying out operation or not may be provided. The communication terminal body 1 may be provided with a reception effectiveness judgment execution selection function to decide whether judgment on the effectiveness of reception should be carried out so that the user can decide whether judgment on the effectiveness of reception should be carried out. Thus, the function of the communication terminal can be expanded.

Embodiment 6

Figure 4:
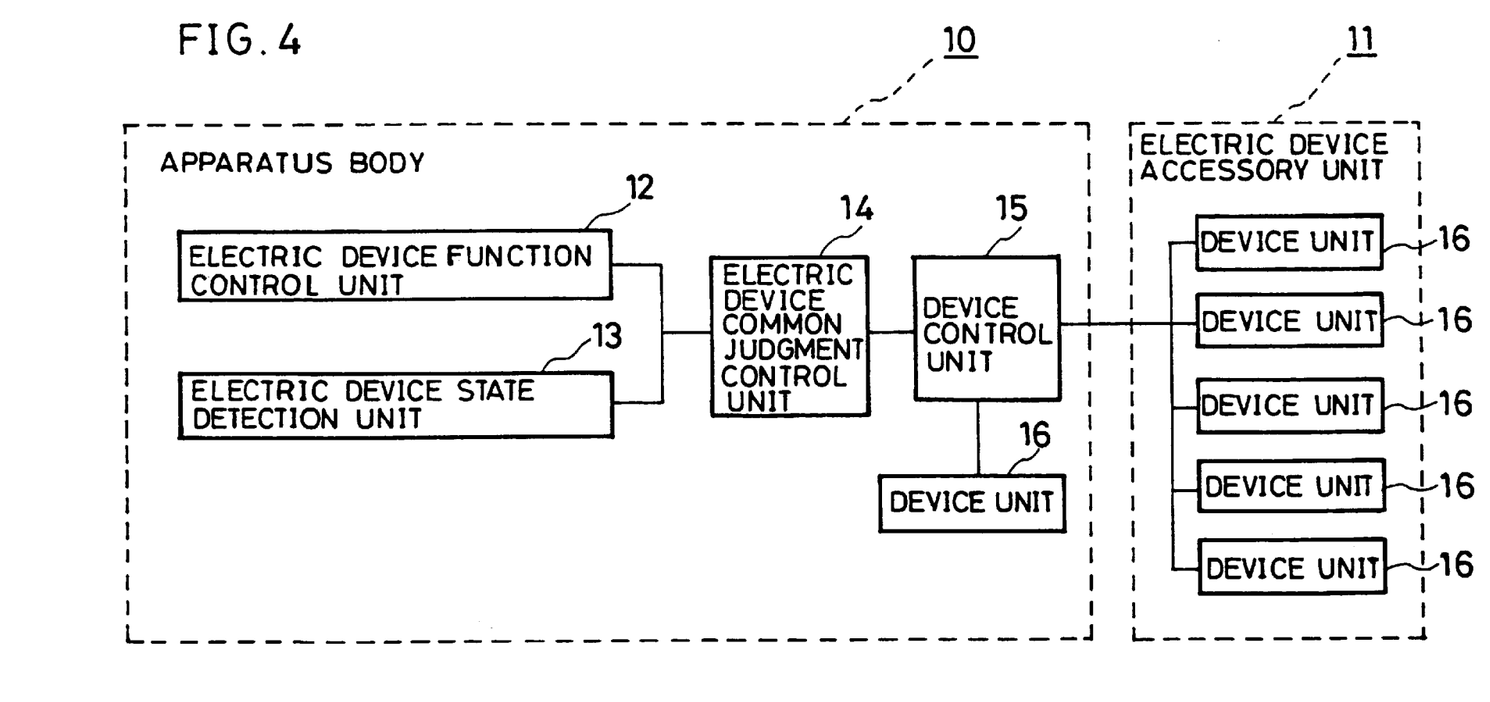
FIG. 4 is a block diagram showing the constitution of a multiple-service offering apparatus according to Embodiment 6 of the present invention.

FIG. 4 is a block diagram of a multiple-service offering apparatus according to Embodiment 6 of the present invention. Reference numeral 10 denotes an apparatus body for carrying out the functions of electric devices connected to the multiple-service offering apparatus, and 11 an electric device accessory unit which can be connected to or disconnected from the apparatus body 10. The electric device accessory unit 1 consists of a plurality of device units 16 such as a display, speaker and LED. The apparatus body 10 comprises an electric device control unit 12 for controlling the functions of electric devices, an electric device state detection unit 13 for monitoring and detecting the state such as a failure of each of the electric devices, an electric device common judgment control unit 14 which is common control means for judging how to inform the device units 16 of the electric device accessory unit 11 and a device unit 16 provided in the apparatus body 10 of a failure or the like, and a device control unit 15 for controlling the device units 16 of the electric device accessory unit 11 and the device unit 16 of the apparatus body 10. The electric device common judgment control unit 14 has a function to inform the user using two or more or all of the plurality of device units, an information cancellation function to update information to be provided to the plurality of device units, and an operation continuation function to hand over the operation of a device unit in operation to another device unit.

In the above-structured multiple-service offering apparatus, the user is informed only by a predetermined necessary device unit out of the plurality of device units.

Meanwhile, in the electric device common judgment control unit 14, when it is judged that information is urgent or should be first provided to the user, the electric device common judgment control unit 14 controls all the device units 16 to provide the information to the user swiftly. Therefore, the user does not need to select an effective electric device and information on a failure or the like can be provided to the user quickly. Even when any one of the device units 16 of the electric device accessory unit 11 or the device unit 16 of the apparatus body 10 is disconnected, a user informing function is continued and when information on recovery from a failure or the like is to be updated, a multiple-device informing function is canceled and information to be provided to the plurality of devices can be thereby updated. Therefore, the efficiency of the way of informing the user can be improved.

As described above, the multiple-service offering communication terminal according to the first aspect of the present invention comprises means of informing a user of a failure or the like using two or more connected devices or all the connected devices. Therefore, the operation of checking information by selecting a plurality of accessory terminals or devices is not required and the operation efficiency of the communication terminal can be improved.

In the multiple-service offering communication terminal according to the second aspect of the present invention, accessory terminals can be disconnected from a communication terminal body and a user informing function is continued even when an accessory terminal is disconnected. Therefore, the operation efficiency of the communication terminal can be further improved.

In the multiple-service offering communication terminal according to the third aspect of the present invention, when an accessory terminal to be disconnected carries out communication, the communication is continued by handing it over to another accessory terminal. Therefore, the operation of powering on again or resetting the communication terminal by suspending the current service can be made unnecessary.

In the multiple-service offering communication terminal according to the fourth aspect of the present invention, when information on recovery from a failure or the like is to be updated, the multiple-device informing function is canceled and information to be provided to the plurality of devices is updated. Therefore, the output of wrong information to the user can be prevented.

The multiple-service offering communication terminal according to the fifth aspect of the present invention comprises reception effectiveness judging means for judging whether received information should be provided or not based on the operation state of an accessory terminal when voice or data information is received. Therefore, unnecessary received information for the user can be abandoned and the user's operation of an accessory terminal can be continued.

The multiple-service offering apparatus according to the sixth aspect of the present invention comprises common control means having a function to inform the user using two or more, or all of a plurality of devices, an information cancellation function to update information to be provided to the plurality of devices, and an operation continuation function to hand over the operation of a device in operation to another device. Therefore, the informing ability and operation efficiency of the apparatus can be improved like the above multiple-service offering communication terminal.

What is claimed is:

1. In a multiple-service offering communication terminal for providing to a user a plurality of communication services including voice communication and data communication, said communication terminal having a plurality of accessory terminal devices including a display device and a speaker device, an accessory terminal control unit for selectively activating said plurality of accessory terminal devices in response to an accessory control signal, and a multiple-service control unit for providing an accessory control signal to said accessory terminal control unit in response to a communication service control signal, the improvement comprising:

a common judgment control unit for determining communication services being supplied to said communication terminal and determining the existence of failures or faults in said communication terminal or in a communication circuit coupled to said communication terminal as indicated by a fault signal from a communication state detection unit, and for sending to said accessory terminal control unit a fault informing signal in response to said fault signal, for causing said accessory terminal control unit to activate at least two of said accessory terminal devices to inform a user of the existence of such fault or failure.

2. The multiple-service offering communication terminal of claim 1, wherein the accessory terminals can be disconnected from a communication terminal body and the common judgment control unit can continue its function to inform the user even when an accessory terminal is disconnected.

3. The multiple-service offering communication terminal of claim 2, wherein when an accessory terminal to be disconnected carries out communication, the communication is continued by handing it over to another accessory terminal.

4. The multiple-service offering communication terminal of claim 1, wherein when information on recovery from a failure or the like is to be updated, a multiple-service informing function is canceled and the information to be provided to the plurality of devices is updated.

5. The multiple-service offering communication terminal of claim 1 which further comprises means for judging whether received information should be provided to the user based on the operation state of an accessory terminal when voice or data information is received.

6. A multiple-service offering apparatus which comprises a plurality of devices each having at least one of a display and a speaker and offers a plurality of services to a user, wherein the apparatus further comprises common control means for informing the user of a failure using two or more devices or all of the plurality of devices, an information cancellation function for updating information to be provided to the plurality of devices and an operation continuation function for handing over the operation of a telecommunication device in operation to another telecommunication device.

* * * * *